Aug. 31, 1965     W. C. REXROAT     3,203,255
TRUCK WHEEL BALANCER

Filed June 28, 1962     2 Sheets-Sheet 1

INVENTOR.
Wilbur C. Rexroat
BY

ATTORNEY

Aug. 31, 1965  W. C. REXROAT  3,203,255
TRUCK WHEEL BALANCER
Filed June 28, 1962  2 Sheets-Sheet 2

INVENTOR.
Wilbur C. Rexroat
BY

ATTORNEY

United States Patent Office 3,203,255
Patented Aug. 31, 1965

3,203,255
TRUCK WHEEL BALANCER
Wilbur C. Rexroat, Atlanta, Ga., assignor to Dynamic Center Engineering Co., Inc., Norcross, Ga., a corporation of Georgia
Filed June 28, 1962, Ser. No. 205,983
5 Claims. (Cl. 73—484)

This invention relates to a wheel balancing device, and is more particularly concerned with an improved balancing device for truck wheels, with or without demountable rims.

In the past, many balancing devices have been devised; but, prior art devices have been unsatisfactory in that they require either a demountable rim because the dishout will not fit over the device, or they require the complete wheel in order to facilitate centering of the wheel on the device. To be equipped to balance all truck wheels, therefore, a service station must have two of the prior art devices.

Prior art devices have required that the wheel to be balanced be placed on the precariously balanced carriage. The unwieldiness of many large truck tires makes this quite difficult. Many of the prior art devices include many moving parts which are expensive to manufacture with accurate balance, and will wear, thereby causing difficulty as well as inaccuracy in balancing a wheel.

The device of the present invention overcomes the above stated objections by providing a balancing carriage so designed that the center of the wheel, or the dishout of wheels with demountable rims, will fit over the center of the carriage, while the aligning means acts on the rim only, so that the tire, with or without the dishout may be balanced. Means are provided whereby the balancing carriage can be stabilized to preclude the wobbling of the carriage while a wheel is being placed on the carriage. There are few moving parts in the present device; and these are rugged and well designed to give a long life. Even when the moving parts wear, the balance of the balancing carriage will be affected very little.

In general terms, the device of the present invention includes a base having a vertically movable pivot rod extending axially of said base. Mounted in the base is a jack by which the pivot rod is raised and lowered. A ledge is provided on the base adjacent the pivot rod.

A balancing carriage is supported by the pivot rod, and includes a hub having a central bore in which is the balance point for the carriage. A flange within the hub is adapted to rest on the ledge which is formed on the base to stabilize the balancing carriage. The hub receives a bubble level which indicates the proper balanced position of the carriage.

Radiating from the lower part of the hub are a plurality of arms having movable aligning lugs; and the lugs are mechanically interconnected to be moved simultaneously along the arms. The arms are, of course, symmetric about the hub so that the carriage will be balanced.

It is therefore an object of the present invention to provide a wheel balancing device which will balance truck wheels with or without demountable rims.

It is another object of the present invention to provide a wheel balancing device having means for stabilizing the balancing carriage as a wheel is placed on the carriage.

Another object of the present invention is to provide a wheel balancing device which is inexpensive to manufacture, durable in structure, efficient in operation and very simple to use.

A further object of the present invention is to provide a wheel balancing device in which the rims of wheels are readily and easily clamped in place in a position for the wheel to be balanced, the clamping operation involving the manipulation of a single element, regardless of the rim size.

Other and further objects, features and advantages of the present invention will become apparent from consideration of the following specification when taken in conjunction with the accompanying drawings in which.

Referring now in detail to the embodiment chosen for the purpose of illustrating the present invention, it being understood that in its broader aspects the present invention is not limited to the exact details herein depicted, the balancing device includes a central support member, denoted generally by numeral 10, and a spider 40 mounted on the support member 10 for receiving thereon a tire to be balanced.

Figure 1:
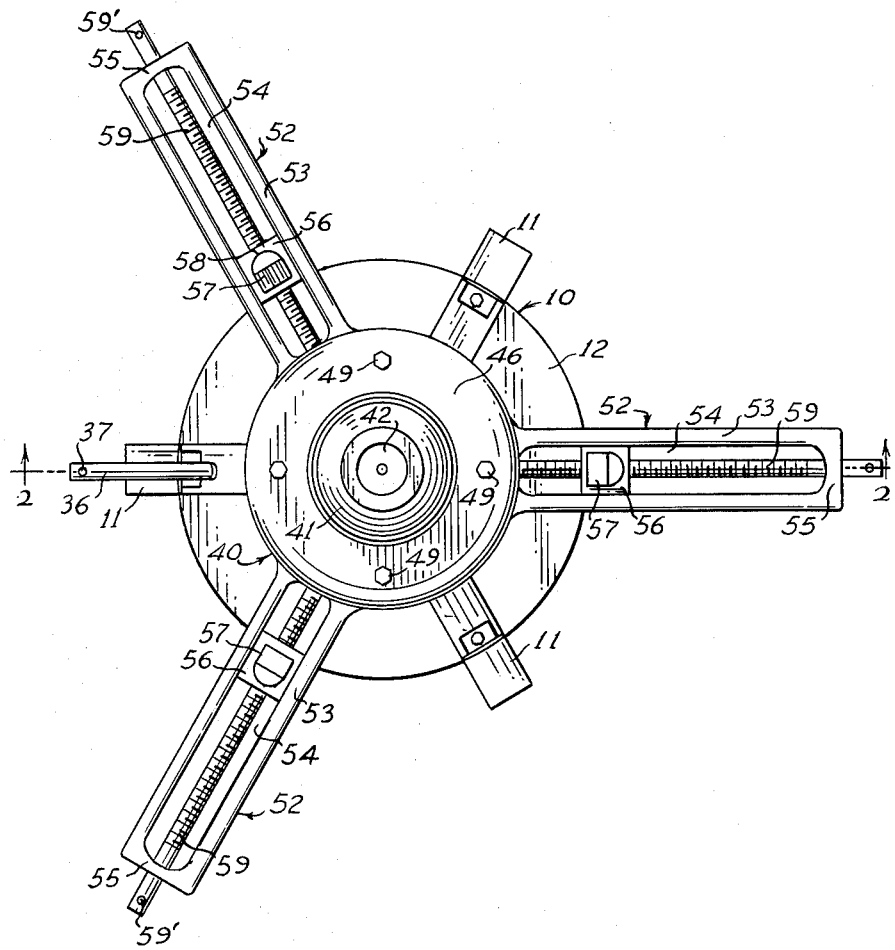
FIG. 1 is a top plan view of one embodiment of the balancer constructed according to the present invention.
Figure 3:
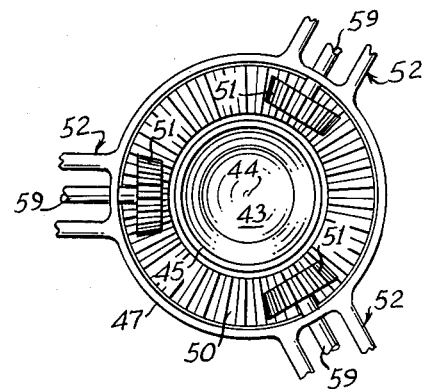
FIG. 3 is a partial bottom view of a detail showing the balancing carriage, the arm being broken away.
Figure 2:
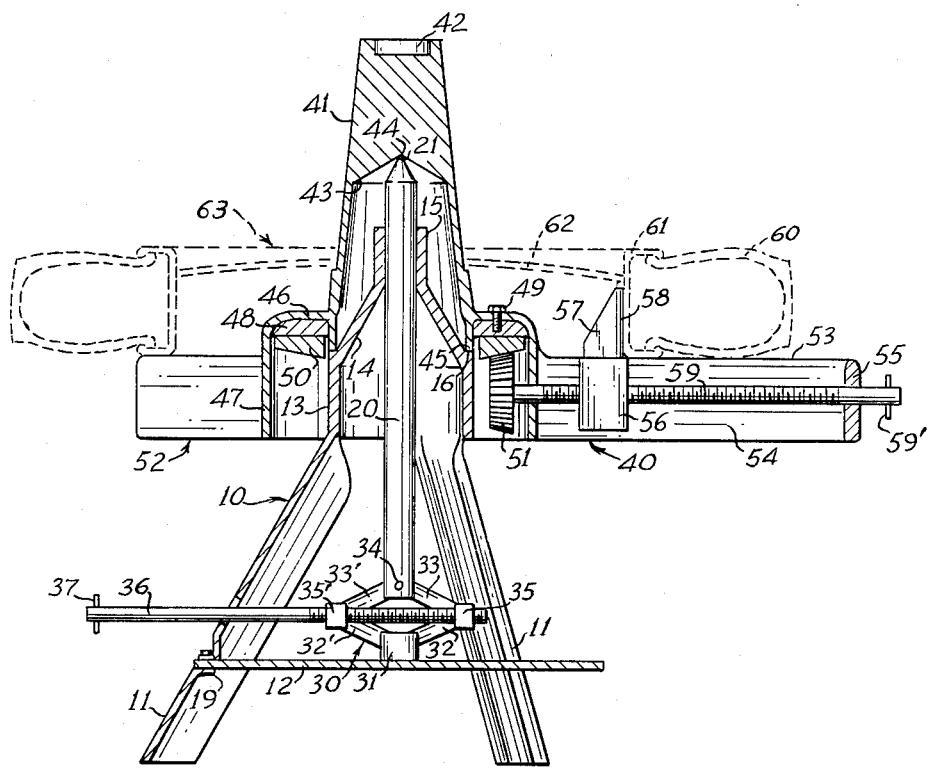
FIG. 2 is a cross sectional view taken substantially along the line 2—2 in FIG. 1.

The support member 10 includes a plurality of upwardly converging legs 11 by means of which the entire structure is supported. The legs 11, as illustrated in FIG. 2, are each channel members, the web portions of which are struck inwardly, intermediate the ends of legs 11 to provide finger 19 which carry a circular platform 12 disposed horizontally within legs 11.

Mounted on the ends of legs 11 is a hollow shaft housing or hub which is concentric with respect to plate 12 and has a vertical axis. In more detail, the hub includes a hollow cylindrical body 13 secured along its lower edge to and supported by the upper ends of legs 11. The upper edge of body 13 is integrally connected to a frustoconical intermediate member 14 which converges upwardly to support an upright hollow cylindrical sleeve 15.

At the junction of body 13 and intermediate member 14 is an annular peripheral ledge or shoulder 16 which is disposed in a horizontal plane. The shoulder 16 provides support for spider 40, as will be explained more fully hereinafter.

Carried within the hub by the sleeve 15 is an upright balance shaft 20, the upper end of which terminates in a point 21. Shaft 20 is slidably carried by sleeve 15 and hence is movable along its axis, upwardly and downwardly. The lower end of shaft 20 terminates within the legs 11, above platform 12.

For moving the shaft 20 upwardly and downwardly, a scissors type jack, denoted generally by numeral 30, is disposed between the platform 12 and the lower end of shaft 20. Jack 30 includes a reaction block 31 mounted at the center of platform 12. A pair of diverging arms 32, 32' are pivotally carried by block 31 and extend upwardly and outwardly therefrom. The arms 32, 32' are pivotally carried on a common pivot pin (not shown). The outer ends of arms 32, 32' are pivotally connected respectively to the outer ends of a pair of complementary inwardly and upwardly extending arms 33, 33', the ends of which protrude into a slot in the end of shaft 20 and are received on a common pivot pin 34. The pivoted ends of arms 32, 33 and 32', 33' carry a pair of horizontally aligned blocks 35, 35', through which a crank shaft 36 extends. The portions of shaft 36 adjacent the blocks 35, 35' are respectively provided with right hand and left hand threads which threadedly engage the internal threads of blocks 35, 35', whereby rotation of shaft 36 will cause the blocks 35', 35 to be urged together while rotation thereof in an opposite direction will cause the blocks 35, 35' to be moved apart. By moving the blocks 35, 35' together, the arm 32, 32', 33, 33' are caused to extend or raise shaft 20 and by moving them apart, the arms 32, 32', 33, 33' are caused to retract or lower shaft 20 by the usual toggle action.

Crank shaft 36 protrudes outwardly, as seen in FIG. 2, passing through an opening in one of legs 11, and is provided at its outer end with a transverse pin 37. A suitable crank (not shown) may be employed to rotate shaft 36.

The spider 40 which carries the tire 60, its rim 61 and, when desired, the dishout 62, in a horizontal position, includes a central hub which sits on and is selectively supported by the hub of supporting member 10 or the shaft 20 thereof. The hub of spider 40 includes a frusto-conical body 41, the upper end of which receives a conventional circular bubble level 42, the level 42 being disposed horizontally. It will be understood that the level 42 has a transparent cover with a central bulls-eye ring thereon for indicating when the hub body 41 is disposed in a vertical position.

The lower inside portion of body 41 is recessed so as to fit over the shaft 20, intermediate member 14 and sleeve 15. The inner surface 43 at the central upper portion of body 42 is upwardly conical for receiving the point 21 of shaft 20 at the apex 44 thereof. The lower edge of body 41 is provided with a flat shoulder 45 which is adapted to register with shoulder 16 of the supporting member, the vertical distance between the apex 44 and the shoulder 45 being less than the vertical distance from shoulder 16 to point 21, when the shaft 20 is in its raised position whereby the spider 40 is entirely supported by point 21. The vertical distance from shoulder 45 to apex 44, however, is greater than the vertical distance from shoulder 16 to point 21, when the shaft 20 is in its lowered position and, therefore, the shoulder 16 supports the spider 40, under this condition.

According to the present invention, the body 41, slightly above shoulder 45, is provided with a peripheral outwardly extending flange 46 which is disposed horizontally. The outer periphery of flange 46 is provided with a housing ring 47 which depends therefrom and encircles the body 13. A bearing collar 48 is disposed below flange 46 and is secured thereto by bolts, such as bolt 49. Below the collar 48 is an annular ring gear 50 having downwardly protruding teeth for meshing with the peripheral teeth of gears 51 within the space between ring 47 and body 13. The teeth of ring gear 50 are bevelled outwardly while the teeth of gears 51 are bevelled inwardly so that the gears 51 mesh more closely upon inward movement thereof.

The spider 40 includes a plurality (three) of radially evenly spaced wheel receiving arms 52 extending from housing ring 47. The uper surfaces 53 of receiving arms 52 are disposed in a single radial plane with respect to the central vertical axis of spider 40, the radial plane being substantially below vertex or apex 44.

Each receiving arm 52 is provided with a vertical slot 54 throughout substantially its entire length to thereby provide at the outer end of each arm 52 an end plate 55. Within each slot 54 is a slidable travel block 56, carrying an upstanding rim engaging lug 57 with a vertically disposed outer rim engaging surface 58. The travel blocks 56 have horizontal bores with internal threads which respectively threadedly engage the external threads of the lug adjusting rods 59.

The lug adjusting rods 59 also extend through the plates 55 and through the housing ring 47 and respectively receive on their inner ends the gears 51. Outwardly of plate 55, each rod 59 is provided with a radial pin 59' by means of which the rod 59 may be rotated.

Since the ring gear 50 is free to rotate, and all gears 51 mesh therewith, the rotation of all shafts or rods 59 is synchronized. Thus, all rim engaging lugs 57 will be moved outwardly or inwardly in synchronization, whereby all lugs 57 are maintained at the same distance from the vertical axis of spider 40 at all times.

From the foregoing description the operation of the present invention should be apparent.

The spider 40 is symmetrical with a center of gravity below the apex 44. Therefore, spider 40 will balance on point 21 when the shaft 20 is raised. The shaft 20, however, is initially in a lowered position. A wheel 63 with its tire 60 is placed over the spider 40 so that it rests flat against the upper surfaces 53 of arms 52. Next, a crank (not shown) is placed on the outer end of one of the lug adjusting rods 59. The crank (not shown) is then manipulated so as to rotate all other rods 59 through the gears 50, 51 so that all blocks 56 are moved outwardly simultaneously, the blocks 56 carrying lugs 57 outwardly until the lug surfaces 58 engage the rim 61. Since all lugs 57 are moved outwardly, simultaneously, they push against the rim 61 until the rim 61 is concentric with the vertical axis of spider 40. The crank is then removed so that the symmetrical spider 40 is again in balance.

The crank is then employed on shaft 36 to raise the shaft 20, via jack 30. The raising of shaft 20 lifts the spider 40 from a position of rest on shoulder 16. Since, even with the tire 60 and wheel 63, the center of gravity of spider 40 is below the apex 44, the static unbalance of the wheel 63 and tire 60 will be indicated by level 42, the spider 40 tilting in the direction of the heavy portion of the tire and wheel.

By placing weights on the surface of rim 61 opposite the heavy side of tire 60 and wheel 63, the tire 60, wheel 63 and spider 40 may be brought into balance whereby the bubble of bubble level 42 is disposed within the bulls-eye.

Next, the weights are divided in half and one-half the weight is secured to the top side of the rim 61 while the other half of the weight is secured to the bottom side thereof. The balanced tire may now be removed by loosening of lugs 57.

Since the tire 60 and wheel 63 are secured to the spider 40 by the lugs 57, it is immaterial whether or not the tire has a dishout 62 on it or not. If a dishout 62 is present, the body 41 of spider 40 is sufficiently small that the wheel 63 may be placed thereover so that the body 41 protrudes through the central hole in dishout 62.

It will thus be seen that the device of the present invention provides a quick and simple balancing device which may be used with any standard truck wheel.

It will be understood that the device here presented is by way of illustration only, and is meant to be in no way restrictive; therefore, numerous changes and modifications may be made, and the full use of equivalents resorted to without departing from the spirit or scope of the invention as outlined in the appended claims.

I claim:

1. In a wheel balancing device of the type having a supporting member with an upstanding balance point, the combination therewith of a spider adapted to be supported on said point, said spider including a body disposed over said point and a plurality of arms radiating from said body said arm being sufficiently long to receive thereon and support both the tire and rim portion of a wheel concentrically on said spider, a plurality of upstanding lugs carried by said arms and moveable in radial paths, said lugs extending sufficiently above said arms that they respectively engage radially spaced peripherial portions of the rim of said tire on said arms when said lugs are moved outwardly in their radial paths, and means for simultaneously moving all lugs inwardly and outwardly with respect to their respective arms.

2. In a tire balancing device of the type having a supporting member with an upstanding balance point, the combination therewith of a spider adapted to be supported on said point, said spider including a body disposed over said point, a plurality of arms radiating from said body, a plurality of upstanding lugs carried by said arms, means for simultaneously moving all lugs inwardly and outwardly, said last mentioned means including a ring gear carried by said body, a plurality of ring follower gears corresponding to the number of arms on said spider and meshing with said ring gear, and a plurality of shafts threadedly engaging said lugs and secured to said follower gears for rotation therewith.

3. A wheel balancing device comprising a supporting member and a spider carried by said supporting member, said supporting member being characterized by a supporting member body, a vertically movable shaft within said body, a jack carried by said body and connected to the lower end of said shaft, and crank means for operating said jack to raise and lower said shaft within said body, said shaft having a point at its upper end, said body being provided with a flat annular shoulder below said point of said shaft, said spider being characterized by a spider body having a downwardly opening recess, the upper surface of said spider body within said recess being conical and having an apex for receiving said point, said spider body being provided with a shoulder for registering with said shoulder of said supporting member body, arms radiating from said spider body, the upper surfaces of said arms being disposed in a plane normal to the axis of said spider body, lugs carried by said arms, said lugs protruding above the plane of said upper surfaces of said arms, means for simultaneously moving said lugs radially with respect to said shaft, and a bubble level mounted on said spider for indicating when said spider is level.

4. A tire balancing device comprising a supporting member and a spider carried by said supporting member, said supporting member being characterized by an upstanding shaft, and means for supporting said shaft, said spider being characterized by a spider body having a downwardly opening recess, the upper surface of said spider body within said recess being conical and having an apex for receiving said point, arms radiating from said spider body, the upper surfaces of said arms being disposed in a plane normal to the axis of said spider body, said arms being provided respectively with vertical slots, blocks in said slots, lugs protruding from said blocks above the plane of said upper surfaces of said arms, a gear ring carried by said spider body, a plurality of gears meshing with said gear ring, a plurality of rods each secured to a meshing gear and provided with external threads and carried by said arms for respectively threadedly engaging said blocks to move said blocks simultaneously upon rotation of any one of said rods, and a bubble level mounted on the upper end of said spider body for indicating when said spider is level.

5. A tire balancing device comprising a supporting member and a spider carried by said supporting member, said supporting member being characterized by a supporting member body, a vertically movable shaft within said body, a toggle jack carried by said body and connected to the lower end of said shaft, and crank means for operating said jack to raise and lower said shaft within said body, said shaft having a point at its upper end, said body being provided with a flat annular shoulder below said point of said shaft, said spider being characterized by a spider body having a downwardly opening recess, the upper surface of said spider body within said recess being conical and having an apex for receiving said point, said spider body being provided with a shoulder for registering with said shoulder of said supporting member body, arms radiating from said spider body, the upper surfaces of said arms being disposed in a plane normal to the axis of said spider body, said arms being provided respectively with vertical slots, blocks in said slots, lugs protruding from said blocks above the plane of said upper surfaces of said arms, a gear ring carried by said spider body, a plurality of gears meshing with said gear ring, a plurality of rods each secured to a meshing gear and provided with external threads and carried by said arms for respectively threadedly engaging said blocks to move said blocks simultaneously upon rotation of any one of said rods, and a bubble level mounted on the upper end of said spider body for indicating when said spider is level.

References Cited by the Examiner

UNITED STATES PATENTS

| 1,814,699 | 7/31 | Hubbell | 279—113 |
| 2,110,343 | 3/38 | Taylor | 73—483 |
| 2,199,667 | 5/40 | Lannen | 73—485 |
| 2,270,657 | 1/42 | Kraft | 73—484 |
| 2,464,871 | 3/49 | Kelleher | 73—485 |
| 2,592,804 | 4/52 | Holl | 73—484 |
| 2,698,537 | 1/55 | Taylor et al. | 73—486 |
| 2,879,667 | 3/59 | Henderson | 73—483 |
| 3,035,447 | 5/62 | Carrigan | 73—458 |

FOREIGN PATENTS 746,520   3/56   Great Britain.

RICHARD C. QUEISSER, *Primary Examiner.*

ROBERT L. EVANS, JAMES J. GILL, *Examiners.*